J. SPEAR.
Base-Burning Stoves.
No. 5,459. Reissued June 17, 1873.
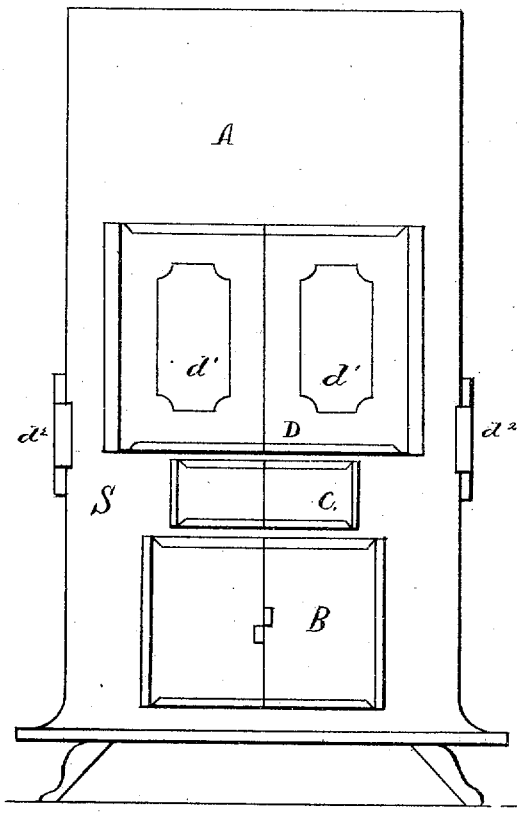
fig. 1.
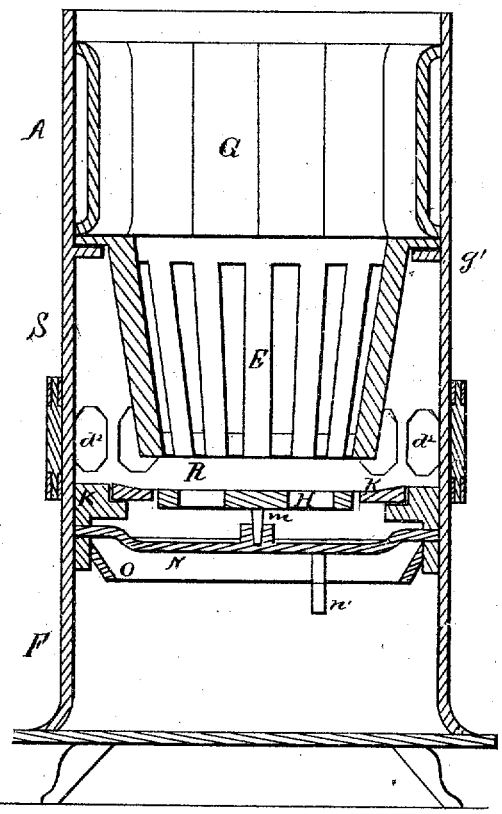
fig. 3. fig. 2.
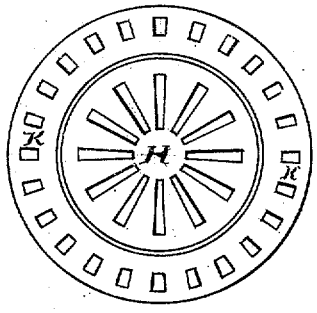
fig. 4.
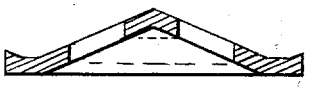
Witnesses:
J. W. Wagner
Lew Hamilton Johnson
Inventor:
James Spear
per Edw. Brown
attorney
AM. PHOTO-LITHOGRAPHIC CO. N.Y. (OSBORNE'S PROCESS.)

UNITED STATES PATENT OFFICE.

JAMES SPEAR, OF PHILADELPHIA, PENNSYLVANIA.

IMPROVEMENT IN BASE-BURNING STOVES.

Specification forming part of Letters Patent No. 100,335, dated March 1, 1870; reissue No. 5,459, dated June 17, 1873; application filed March 18, 1873.

DIVISION A.

*To all whom it may concern:*

Be it known that I, JAMES SPEAR, of the city and county of Philadelphia, and State of Pennsylvania, have invented certain Improvements in Stoves and Heaters, of which the following is a specification:

The nature of my invention consists in the construction and combination of the grate with the fire-pot so as to make an opening between the fire-pot and grate, through which the cinders, slate, and clinkers may be easily removed without any danger of the body of fire falling down into the ash-pit.

The grate is made so as to shake horizontally on a center pivot, or carried on lugs beneath the edge of the grate, and is placed so as to leave an opening between it and the fire-pot, all around, sufficient for the removal of slate and clinkers; and to prevent the unburned coals falling out I make the grate-surface larger than the lower mouth or discharge-end of the fire-pot, so that the slate and clinkers will bank up after they fall from the fire-pot, and fall from the grate, through the space between its periphery and the wall of the stove, only when the grate is shaken. Space is left between the periphery of the grate and the wall of the stove, through which the clinkers fall into the ash-pit. In the arrangement of the space between the grate and fire-pot for the removal of slate and clinkers I afford better access to this opening by suspending the fire-pot so that its lower or discharge end, together with the grate, are on a line or plane below the top of the air-chamber immediately surrounding them. This, together with mica windows, affords a better view of the state of the fire, and also more convenient access to the space for removing the slate and clinkers.

To enable others skilled in the art to make and use my invention, I will now proceed to describe its construction and operation, reference being had to the accompanying drawings, of which—

Figure 1 is an elevation of the outside body. Fig. 2 is a section through the stove. Fig. 3 is a plan of the grate. Fig. 4 is a transverse section through grate, showing a raised center.

A is the usual outside body or casing of the stove. This casing or wall of the stove joins the fire-pot at the point $g'$, on a line above the discharge-end of the fire-pot and below the top of the fire-pot, and is fitted in close contact with it so as to exclude the air for combustion which enters the ash-pit through the door B from passing upward except through the grate H, the opening R, or the grated fire-pot. This arrangement permits of an unobstructed view of the surface of the fire above the fire-pot through the mica windows usually arranged around it for that purpose. In my invention I make an air or draft-chamber, S, around the discharge-end of the fire-pot, so that the fire-pot projects downward into the said air-chamber. This air-chamber is immediately above the ash-pit F, and in full communication with it through the annular space around the periphery of the grate. C are doors through which the usual bar is inserted for shaking the grate so that the ashes may fall through it, and the slate and clinkers from its periphery. D are doors with mica windows $d^1$ through which the fire may be seen in the grated fire-pot and also upon the grate, thereby assisting the operator in directing his action while removing the clinkers by shaking the grate, or by inserting a hooked poker. In the rear of Fig. 2 are seen two pairs of smaller doors, $d^2$, for a similar purpose of observing the fire and the removal of clinkers. Should the fire stick in the grated fire-pot, or clinkers stick in the grate, the large doors D or the small ones $d^2$ are opened, and the fire and clinkers operated upon by a poker inserted for that purpose. In this way the state of the fire can be regulated with great exactness. The basket-grate E is suspended from the casing A by a ring at its upper edge, and projects downward into the draft-chamber S, so that the state of the fire upon the grate may be more easily seen, and more convenient access obtained for the insertion of a poker above the grate and the removal of slate and clinkers. Above the basket-grate is the fire-brick pot G. The coals are fed to the fire by a door above or by a reservoir with revolving light outside, as is customary with stoves at present in use, and as described in my patent dated July 7, 1868, No. 79,696. Beneath the basket-grate E is placed the grate H, altogether clear from it, at a distance of two or three inches, the distance varying according to the size of the coal and diameter of the grate. The outside of this grate is a circular ring, K, forming part of the grate-surface, resting in four guides, K′, secured to the casing and free to rotate within them. This ring is somewhat larger than the lower mouth of the fire-pot, and is curved a little upward at the edge so that the coals and cinders are banked up, and thereby prevented from falling out. Inside this ring is a circular grate, H, having openings for air, and turning on a pivot, *n′*, resting on the cross-bar N, which is pivoted to the sides of the base or ash-pit, and by means of the arm *n′* the grate H may be dumped. This rotating and dumping movement has been fully described in my previous patent. The shaking of the grate horizontally upon the center-pin *n′* with a vibratory motion throws the slate and clinkers by centrifugal force from the center toward the edge of the grate over which they fall. If any remain they may be dislodged by a poker inserted through the doors placed around the opening R for that purpose.

In a stove constructed in this manner I have the advantage of seeing at all times the exact state of the fire, and of regulating its intensity with very little trouble. The grate H is at such a distance from the wall of the base that the clinkers and slate may fall therefrom over its periphery into the pan placed within the base, the necessary direction being given to them by the deflector O. (See Fig. 2.) The draft passes to the fire through the grate H, and also through the circular space R. In a stove constructed in this manner all the slate and clinkers can be removed above the grate, and the fire kept up continuously. If, however, the fire be suffered to die out the cinders can be dumped in the usual manner.

It is evident that the grate H and ring K may be cast in one piece, as shown in Fig. 5, so as both to shake together, in which case all the slate, clinkers, and ashes would be removed through the opening R, and the fire continuously kept up, as before described.

It is also evident that, in the application of my invention, a solid fire-pot or a clay fire-pot within an iron cylinder may be used in place of the grated fire-pot herein shown.

I claim—

1. A horizontally-vibrating grate with a surface for the coal to rest on, larger than the lower or discharge end of the fire-pot, supported at a distance from the lower end of the fire-pot sufficient to form the opening R for the removal of slate and clinkers over the periphery of the said grate.

2. The arrangement of a fire-pot with its lower or discharge end suspended or projecting downward within the air-chamber S, in combination with a vibrating grate of larger diameter than the lower end of said fire-pot, suspended at a distance below the said discharge-end sufficient for the removal of slate and clinkers over its periphery, as herein described.

3. The grate and fire-pot combined and arranged as described, to form the opening R in combination with mica lights, or mica lights in doors arranged around the said opening, as and for the purpose set forth.

4. The fire-pot E suspended or projecting downward within the air-chamber S, in combination with a vibrating grate of larger diameter than the discharge-end of the said fire-pot, arranged at a distance therefrom sufficient for the removal of slate and clinkers over its periphery between it and the wall of the stove, and the mica lights around the opening R, all combined and arranged substantially as herein set forth.

Witnesses: JAMES SPEAR.

EDWD. BROWN,
JOHN F. GRANT.